3,154,421
COMPOSITION FOR TREATING MEAT
Marvin M. Voegeli, Downers Grove, and Henry J. Gorsica, Northbrook, Ill., assignors to B. Heller & Company, a corporation of Illinois
No Drawing. Filed June 15, 1961, Ser. No. 117,269
13 Claims. (Cl. 99—159)

This invention relates to a composition for the treatment of animal materials, such as meat and blood, to obtain a more desirable color. More particularly, it deals with a method for the treatment of uncured meat to maintain a bright red color.

The present invention resides in new treating compositions capable of maintaining an attractive, uniform, bright red color in red meats. The compositions comprise a synergistic combination of phosphate buffering agent, a poising agent to control oxidation-reduction potential, and a sequestering agent which can be used in foods and is primarily adapted to complex polyvalent metal ions such as iron and nickel.

Meat contains coloring matter or pigments including myoglobin, hemoglobin, and cytochrome, all of which are compounds of ferro- or ferriheme and protein. Myoglobin, to illustrate by reference to one of the pigments present in red meat is purplish-red in color and may change color either through reduction or oxidation. It is, for example, converted to a bright red color by oxidation to a limited extent, i.e., the stage wherein the material is referred to as oxymyoglobin. The bright red oxymyoglobin may be further oxidized, and in the latter stage becomes greyish brown in color.

The problem in connection with red meats is that the iron compounds in the myoglobin must be maintained in a reduced state, i.e., at a valence of 2, while the myoglobin itself must be maintained in an at least partially oxidized state if a bright red color is to be maintained.

One known method of maintaining a bright red color in meat has been the mixing therewith of nicotinic acid, a vitamin sometimes referred to as niacin. Nicotinic acid alone shows best results when air is excluded from the meat as when the meat is sealed in air-impermeable envelopes. However, under these conditions where air is excluded from contact with the surface of the meat, the exterior of the meat will turn brown. To prevent the change in surface color of the meat, a reducing agent generally is mixed with the meat-niacin mixture.

It has now been discovered that an essentially three-component mixture of constituents may be combined to form a composition capable of stabilizing of the red color of meat, particularly during and after grinding operations. The constituents of this basically three-component mixture are a phosphate buffering agent, an oxidation-reduction poising agent and a sequestering agent capable of complexing polyvalent metal ions.

Phosphate buffering agents useful in this invention, are the salts which will bring an aqueous solution of the mixture to a pH value close to the natural pH of meat. This natural pH of untreated meat is 6.2. The buffering agent should maintain a pH in the range between about 5 and about 7, with a pH in the range between about 6.0 and 6.5 preferred.

Typical phosphate buffers are the water soluble sodium and potassium phosphates such as pyrophosphate, orthophosphate, hexametaphosphate and tripolyphosphate. Some of the phosphate salts, such as trisodiumphosphate function purely as a buffer. On the other hand, polymerized phosphates such as tetrasodium or tetrapotassium pyrophosphate act both as a buffer and as a sequestrant for heavy metal ions. It is preferred for the purposes of this invention, to use the polymerized phosphates because they supplement the action of the sequestering agents through strong affinity for ions such as copper which may be only weakly complexed by sequestering agents having an affinity for iron and nickel.

Poising agents are incorporated in the compositions of this invention to control the oxidation-reduction potential and to avoid fluctuation in conditions to an extent permitting either strong reduction of the coloring compounds such as myoglobin or appreciable oxidation of the ferrous ions therein. Useful poising agents are the water soluble sodium and potassium salts of ascorbic acid, erythorbic acid and reductic acid.

Useful sequestering agents are those having an affinity for polyvalent metal ion catalysts of oxidation, particularly for the metal ions, iron and nickel. Some of the sequestering agents show a greater affinity for one polyvalent metal ion than another and, therefore, it is sometimes advantageous to use a mixture of agents which will not only tie up iron and nickel but also copper, zinc and manganese. Typical agents of this type permitted in foods are the sodium and potassium salts of, for example, citric acid, tartaric acid, ethylenediaminetetraacetic acid, and the like.

In this discussion, reference is made to the use of various salts. It will be understood that the basic composition may be prepared from the free acids such as, for example, citric acid and erythorbic acid provided alkali in at least molecular equivalent amounts for reaction with the acids is incorporated in the mixture. The compositions of this invention may also be formed from combinations of various salts, free acids and alkalis. Alkalis useful for this purpose are sodium carbonate, sodium bicarbonate, potassium carbonate, potassium bicarbonate.

Basic compositions of the above discussed type may have inert material or diluents added thereto such as salt (sodium chloride), sugar, dextrose, lactose, etc. The basic compositions may be adapted to special purposes such as use in pork sausage, by incorporation therein of essential oils, oleo-resins of spices and fat antioxidants such as butylated hydroxy anisole, butylated hydroxy toluene and propyl gallate. Where the basic composition is specifically adapted for incorporation into such materials as portion-packed meats, there may be incorporated therein additives such as cereals, dry milk powder, casein, sodium caseinate, preservatives, enzyme tenderizers, for example, ficin, papain, bromelin and the like, vegetable gums, etc.

While in general, as indicated previously, it is preferred for practical purposes, to add the dry composition to coarse ground meat and then regrind the mixture to effect uniform distribution of the composition, the composition can be used separate from or in combination with the usual curing agents. Similarly, in the wet process, the meat can be soaked or injected with the solution of the composition. From the discussion as applied to ground meat, it is not to be understood that the use of the compositions of this invention are limited to application to this physical form of red meat. The dry or wet compositions may be applied to the surface of steaks, roasts, and other solid pieces of meat as well as applied by means of injection and similar methods of treatment. Basic compositions in dry form or in aqueous solution form may or may not contain diluents.

Dry compositions may contain the essential components in amounts by weight as follows.

| Material: | Percent by weight |
|---|---|
| Phosphate buffering agent | 50–77 |
| Poising agent | 25–8 |
| Sequestering agent | 25–15 |

Inert material may be added to the above composition as desired. In the case of salt, the amount of diluent salt is generally limited so that no more than a total of 2 lbs. of diluted dry composition would be incorporated per 100 lbs. of meat being treated.

Meat treated in accordance with this invention should contain amounts of the components of the composition falling within the following ranges.

| Material: | Percent by weight |
|---|---|
| Phosphate buffering salt | 0.02–2 |
| Poising agent | 0.01–0.2 |
| Sequestering agent | 0.01–0.4 |
| Inerts plus meat | Balance |

When utilizing the above composition for the treatment of meat, sufficient amounts of poising agent plus phosphate buffering salt must be incorporated to constitute 0.3% by weight of the treated meat if the composition is to have a discernible effect upon the color of red meat.

The invention is more specifically described by reference to specific examples illustrating the composition and the preferred manner of use of the composition. Obviously, other formulation techniques and methods of use other than those described in detail in the following examples can be employed depending upon the exigencies of the situation.

EXAMPLE I

A dry meat treating mixture was prepared by dry blending the following:

| | Ozs. |
|---|---|
| Trisodiumphosphate | 3.2 |
| Sodium citrate | 1.6 |
| Sodium erythorbate | 1.6 |
| Sodium chloride | 1.6 |

100 lbs. of ground round steak was treated by dry mixing with 8 ozs. of the above composition and regrinding the resultant mixture to obtain a uniform distribution of the treating composition.

The reground meat contained on an approximate weight basis.

| | Percent |
|---|---|
| Trisodiumphosphate | 0.2 |
| Sodium citrate | 0.1 |
| Sodium erythorbate | 0.1 |
| Sodium chloride | 0.1 |

Samples of untreated and treated meat were shaped into patties and the surface thereof rendered relatively smooth. Each pattie was enclosed in a transparent plastic box of a volume considerably greater than that taken up by the pattie. Packaged patties are stored in a refrigerator maintained at about 45° F. and the color of the exposed side of the control pattie and pattie containing treated meat are compared daily for 5 days.

The results are shown below:

*Table I*

| Sample | Observed Color of Sample | | |
|---|---|---|---|
| | 1 day | 3 days | 5 days |
| Control | Brownish Red | Reddish Brown | Brown. |
| Treated | Bright Red | Red | Brown Red. |

EXAMPLE II

A dry meat treating mixture was prepared by dry blending the following:

| | Ozs. |
|---|---|
| Tetrapotassiumpyrophosphate | 3.2 |
| Potassium citrate | 1.6 |
| Erythorbic acid | 1.6 |
| Potassium chloride | 1.6 |

100 lbs. of ground round steak was treated by dry mixing with 8 ozs. of the above composition and regrinding the resultant mixture to obtain a uniform distribution of the treating composition.

The reground meat contained on an approximate weight basis:

| | Percent |
|---|---|
| Tetrapotassiumpyrophosphate | 0.2 |
| Potassium citrate | 0.1 |
| Erythorbic acid | 0.1 |
| Potassium chloride | 0.1 |

Samples of untreated and treated meat were shaped into patties and the surface thereof rendered relatively smooth. Each pattie was enclosed in a transparent plastic box of a volume considerably greater than that taken up by the pattie. Packaged patties are stored in a refrigerator maintained at about 45° F. and the color of the exposed side of the control pattie and pattie containing treated meat are compared daily for 5 days.

The results are shown below:

*Table II*

| Sample | Observed Color of Sample | | |
|---|---|---|---|
| | 1 day | 3 days | 7 days |
| Control | Brownish Red | Reddish Brown | Brown. |
| Treated | Bright Red | Red | Reddish Brown. |

EXAMPLE III

A dry meat treating mixture was prepared by dry blending the following:

| | Ozs. |
|---|---|
| Tetrapotassiumpyrophosphate | 6.4 |
| Potassium citrate | 0.48 |
| Sodium ascorbate | 0.8 |
| Sodium chloride | 0.32 |

100 lbs. of ground round steak was treated by dry mixing with 8 ozs. of the above composition and regrinding the resultant mixture to obtain a uniform distribution of the treating composition.

The reground meat contained on an approximate weight basis:

| | Percent |
|---|---|
| Tetrapotassiumpyrophosphate | 0.4 |
| Potassium citrate | 0.03 |
| Sodium ascorbate | 0.05 |
| Sodium chloride | 0.02 |

Samples of untreated and treated meat were shaped into patties and the surface thereof rendered relatively smooth. Each pattie was enclosed in a transparent plastic box of a volume considerably greater than that taken up by the pattie. Packaged patties are stored in a refrigerator maintained at about 45° F. and the color of the exposed side of the control pattie and pattie containing treated meat are compared daily for 5 days.

The results are shown below:

*Table III*

| Sample | Observed Color of Sample | | |
|---|---|---|---|
| | 1 day | 3 days | 5 days |
| Control | Brownish Red | Reddish Brown | Brown. |
| Treated | Red | Red | Brownish Red. |

EXAMPLE IV

A dry meat treating mixture was prepared by dry blending the following:

| | Ozs. |
|---|---|
| Tetrapotassiumpyophosphate | 4 |
| Ascorbic acid | 1.68 |
| Citric acid | 1.68 |
| Potassium carbonate | 1.44 |

100 lbs of ground round steak was treated by dry mixing with 8.8 ozs. of the above composition and regrinding the resultant mixture to obtain a uniform distribution of the treating composition.

The reground meat contained on an approximate weight basis:

| | Percent |
|---|---|
| Tetrapotassiumpyrophosphate | 0.25 |
| Ascorbic acid | 0.105 |
| Citric acid | 0.105 |
| Potassium carbonate | 0.09 |

Samples of untreated and treated meat were shaped into patties and the surface thereof rendered relatively smooth. Each pattie was enclosed in a transparent plastic box of a volume considerably greater than that taken up by the pattie. Packaged patties are stored in a refrigerator maintained at about 45° F. and the color of the exposed side of the control pattie and pattie containing treated meat are compared daily for 5 days.

The results are shown below:

*Table IV*

| Sample | Observed Color of Sample | | |
|---|---|---|---|
| | 1 day | 3 days | 5 days |
| Control | Red | Reddish Brown | Brown. |
| Treated | Bright Red | Red | Brownish Red. |

EXAMPLE V

A basic meat treating mixture was prepared by dry blending:

| | Ozs. |
|---|---|
| Tetrapotassiumpyrophosphate | 0.32 |
| Potassium citrate | 0.16 |
| Erythorbic acid | 0.16 |
| | 0.64 |

The mixture was dissolved in 8 fluid ounces of water. Pairs of sirloin steaks cut to approximately ¾ inch thickness were painted with the solution in amounts to use the 0.64 oz. of basic composition to treat 100 lbs. of steak. One steak of each pair was tightly wrapped in MSAT cellophane, the other was left unwrapped. Both were placed in a transparent plastic box and kept in the refrigerator.

The results are shown below:

*Table V*

| Sample | Observed Color of Sample | | |
|---|---|---|---|
| | 1 day | 4 days | 7 days |
| Control unwrapped steak. | Medium Red. | Dark Purplish Red. | Dark Brown. |
| Control wrapped steak. | Pale Brownish Red. | Dark Brown | Do. |
| Treated unwrapped steak. | Deep Red | Red | Brown. |
| Treated wrapped steak. | Medium Red | do | Do. |

The composition of this invention, as explained previously, is a composition comprising three essential elements. This composition has a synergistic effect and the components of the composition cooperate to maintain the red color of meat during storage, subsequent freezing or other operations, i.e., under conditions where any two of the three components of the composition fail.

The inadequacy of the various compositions having two of the three components of applicants' previously described composition is most pronounced when compared on the basis of effectiveness in commercial practice. To illustrate with reference to ground meat, the grinding is done in equipment using knives, plates, etc. The ground meat will contain copper derived from bronze knives, will contain iron and nickel derived from steel plates, and the like. During contact of the meat with such equipment, the meat picks up small amounts of metal contaminants which amounts are sufficient to act as catalyzers of one of the primary activities in meat, namely, change of color due to oxidation.

If citrate is omitted and the composition consists predominantly of, for example, sodium ascorbate and trisodium phosphate, the ground meat darkens in color at an accelerated rate, the degree of darkening depending to a large degree upon the extent of contamination with heavy metal ions.

If ascorbate is omitted and the composition consists predominantly of, for example, sodium citrate and trisodium phosphate, the meat will not develop the same brightness and redness of color as meat treated with the three component composition and the rate of surface darkening is much faster than when treated with the three component mixture. In addition, this two component composition fails to maintain a bright color throughout the product.

If phosphate is omitted and the composition consists predominantly of, for example, sodium erythorbate and sodium citrate in amounts such as are used in the compositions of this invention, the red color of the treated meat is not maintained. If the amount of sodium citrate is increased to amounts where some protection is afforded against color change, the amounts are so large as to render the composition economically unfeasible.

From the foregoing description and explanation, it can readily be appreciated that the constituents of the composition of this invention cooperate to attain results which the constituents individually or in two component combinations do not accomplish.

It will be understood that modifications may be made in carrying out the present invention without departing from the spirit and scope thereof and the invention is to be limited only by the appended claims.

1. A composition for treating fresh meat containing myoglobin to maintain the red color thereof comprising in combination as essential constituents, between about 8% and about 25% by weight of an oxidation-reduction poising agent selected from the group of ascorbate, erythorbate and reductate anion-containing water soluble compounds, between about 15% and about 25% by weight of a food grade sequestering agent for polyvalent metal ions and a phosphate buffering agent in quantity to buffer a solution of the composition to a pH between about 5 and about 7.

2. A composition for treating fresh meat containing myoglobin to maintain the red color thereof comprising in combination as essential constituents, between about 8% and about 25% by weight of an oxidation-reduction poising agent selected from the group of ascorbate, erythorbate and reductate anion-containing water soluble compounds, between about 15% and about 25% by weight of a food grade sequestering agent for polyvalent metal ions and a water soluble phosphate buffering agent selected from the group consisting of pyrophosphate, orthophosphate, hexametaphosphate and tripolyphosphate in quantity to buffer a solution of the composition to a pH between about 5 and about 7.

3. A composition for treating fresh meat containing myoglobin to maintain the red color thereof comprising in combination as essential constituents, between about 8% and about 25% by weight of an oxidation-reduction poising agent selected from the group consisting of ascorbate, erythorbate and reductate anion-containing water soluble compounds, between about 15% and about 25% by weight of a food grade organic acid sequestering agent for polyvalent metal ions, an alkaline agent in molecular equivalent amounts required to neutarlize free acids and between about 50% and about 77% by weight of a phosphate buffering agent in quantity to buffer a solution of the composition to a pH between about 5 and about 7.

4. A composition for treating fresh meat containing myoglobin to maintain the red color thereof comprising in combination as essential constituents, between about 8% and about 25% by weight of an oxidation-reduction poising agent selected from the group of ascorbate, erythorbate and reductate anion-containing water soluble compounds, between about 15% and about 25% by weight of a food grade sequestering agent for polyvalent metal ions and between about 50% and about 77% by weight of a phosphate buffering agent in quantity to buffer a solution of the composition to a pH between 6.0 and 6.5.

5. A composition for treating fresh meat containing myoglobin to maintain the red color thereof comprising in combination as essential constituents by weight, between about 8% and 25% of an oxidation-reduction poising agent selected from the group of ascorbate, erythorbate and reductate anion-containing water soluble compounds, between about 15% and 25% of a food grade sequestering agent for polyvalent metal ions and between about 50% and 77% of phosphate buffering agent.

6. A composition for treating fresh meat containing myoglobin to maintain the red color thereof comprising in combination as essential constituents, between about 8% and about 25% by weight of sodium erythorbate, between about 15% and about 25% by weight of sodium citrate and trisodiumphosphate in quantity to buffer a solution of the composition to a pH between about 5 and about 7.

7. A composition for treating fresh meat containing myoglobin to maintain the red color thereof comprising in combination as essential constituents, between about 8% and about 25% by weight of potassium erythorbate, between about 15% and about 25% by weight of potassium citrate, tetrapotassium pyrophosphate in quantity to buffer a solution of the composition to a pH between about 5 and about 7.

8. A composition for treating fresh meat containing myoglobin to maintain the red color thereof comprising in combination as essential constituents, between about 8% and about 25% by weight of an oxidation-reduction poising agent selected from the group of ascorbate, erythorbate and reductate anion-containing water soluble compounds, between about 15% and about 25% by weight of a food grade sequestering agent for polyvalent metal ions and between about 50% and about 77% by weight of a phosphate buffering agent in quantity to buffer a solution of the composition to a pH between about 5 and about 7 and a diluent selected from the group consisting of sodium chloride, sugar, dextrose and lactose.

9. The method of treating fresh meat containing myoglobin to maintain the red color thereof which comprises contacting the meat with a composition containing as essential constituents, between about 8% and about 25% by weight of an oxidation-reduction poising agent selected from the group of ascorbate, erythorbate and reductate anion-containing water soluble compounds, between about 15% and about 25% by weight of a food grade sequestering agent for polyvalent metal ions and between about 50% and about 77% by weight of a phosphate buffering agent in quantity to buffer a solution of the composition to a pH between about 5 and about 7.

10. The method of treating fresh meat containing myoglobin to maintain the red color thereof which comprises contacting the meat with a composition containing as essential components, between about 8% and about 25% by weight of ascorbic acid, between about 15% and about 25% by weight of citric acid, alkaline agent in molecular equivalent amount for neutralization of said free acids, and potassium tetrapyrophosphate in quantity to buffer a solution of the composition to a pH between about 5 and about 7.

11. A method of treating fresh meat containing myoglobin to maintain the red color thereof which comprises incorporating in said meat from about 0.01% to 0.2% of an oxidation-reduction poising agent selected from the group of ascorbate, erythorbate and reductate anion-containing water soluble compounds, from about 0.01% to 0.4% of a food grade sequestering agent for polyvalent metal ions and from about 0.02% to 2% of a phosphate buffering agent with the minimum total of the amounts of phosphate plus oxidation-reduction poising agent being 0.3% based on the weight of the meat.

12. A method of treating fresh meat containing myoglobin to maintain the red color thereof which comprises incorporating in said meat from about 0.01% to 0.2% of sodium erythorbate, from about 0.01% to 0.4% of a food grade sodium citrate and from about 0.02% to 2% of trisodium phosphate with the minimum total of the amount of phosphate plus erythorbate being 0.3% based on the weight of the meat.

13. A method of treating meat containing myoglobin to maintain the red color thereof which comprises depositing on the surface of meat an aqueous solution of a composition containing as basic constituents 0.01% to 0.2% of sodium ascorbate, 0.01% to 0.4% potassium citrate and 0.02% to 2% of tetrasodiumpyrophosphate with the minimum total of the amount of phosphate plus erythorbate being 0.3% based on the weight of the meat.

References Cited in the file of this patent

UNITED STATES PATENTS 2,830,907    Savich et al. _____ Apr. 15, 1959

OTHER REFERENCES

Morse, Food Engineering," October 1955, pages 84–86.